US 6,681,309 B2

(12) United States Patent
Szendy et al.

(10) Patent No.: US 6,681,309 B2
(45) Date of Patent: Jan. 20, 2004

(54) METHOD AND APPARATUS FOR MEASURING AND OPTIMIZING SPATIAL SEGMENTATION OF ELECTRONIC STORAGE WORKLOADS

(75) Inventors: Ralph Becker Szendy, Los Gatos, CA (US); Arif Merchant, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

(21) Appl. No.: 10/058,185

(22) Filed: Jan. 25, 2002

(65) Prior Publication Data

US 2003/0145186 A1 Jul. 31, 2003

(51) Int. Cl.[7] .................. G06F 12/02; G06F 11/34; G06F 11/30
(52) U.S. Cl. .................. 711/173; 711/170; 711/153
(58) Field of Search .................. 707/101, 205; 709/104, 105; 711/1, 5, 129, 147, 153, 156, 165, 170, 173; 714/42, 763, 47

(56) References Cited

U.S. PATENT DOCUMENTS

| 4,189,781 | A | * | 2/1980 | Douglas | 711/173 |
|---|---|---|---|---|---|
| 4,780,815 | A | * | 10/1988 | Shiota | 711/171 |
| 5,012,408 | A | * | 4/1991 | Conroy | 711/172 |
| 5,499,354 | A | * | 3/1996 | Aschoff et al. | 711/129 |
| 5,579,508 | A | * | 11/1996 | Yoshizawa et al. | 711/172 |
| 5,784,698 | A | * | 7/1998 | Brady et al. | 711/171 |
| 5,893,167 | A | * | 4/1999 | Toda | 711/165 |
| 5,930,829 | A | * | 7/1999 | Little | 711/170 |
| 5,991,775 | A | * | 11/1999 | Beardsley et al. | 707/205 |
| 6,151,660 | A | * | 11/2000 | Aoki | 711/129 |
| 6,311,252 | B1 | * | 10/2001 | Raz | 711/117 |
| 6,363,467 | B1 | * | 3/2002 | Weeks | 711/170 |
| 6,366,994 | B1 | * | 4/2002 | Kalyur | 711/173 |
| 6,463,501 | B1 | * | 10/2002 | Kern et al. | 711/100 |

FOREIGN PATENT DOCUMENTS

| EP | 0543614 A1 | * | 11/1992 |
|---|---|---|---|
| JP | 10070243 A | * | 3/1998 |

* cited by examiner

Primary Examiner—B. James Peikari

(57) ABSTRACT

A method and apparatus is provided for measuring and optimizing the orientation of data access of an electronic storage device according to data access characteristics. Monitoring storage access activity in an area of storage space is performed to gather data pertaining to one or more storage access characteristics. Measuring is performed of the characteristics of the storage access activity of at least two individual portions of the storage space. The portions are then combined in a manner to more judiciously utilize storage space. Depending on their homogeneity of access characteristics, the individual portions may then be left alone, merged with other similar portions, or further subdivided into sub-portions, which may be further merged, divided or left alone. At each merger or division determinations can then be made of whether the characteristics of storage access activity of one individual portion or sub-portion are similar to that of another portion according to predetermined criteria.

20 Claims, 6 Drawing Sheets

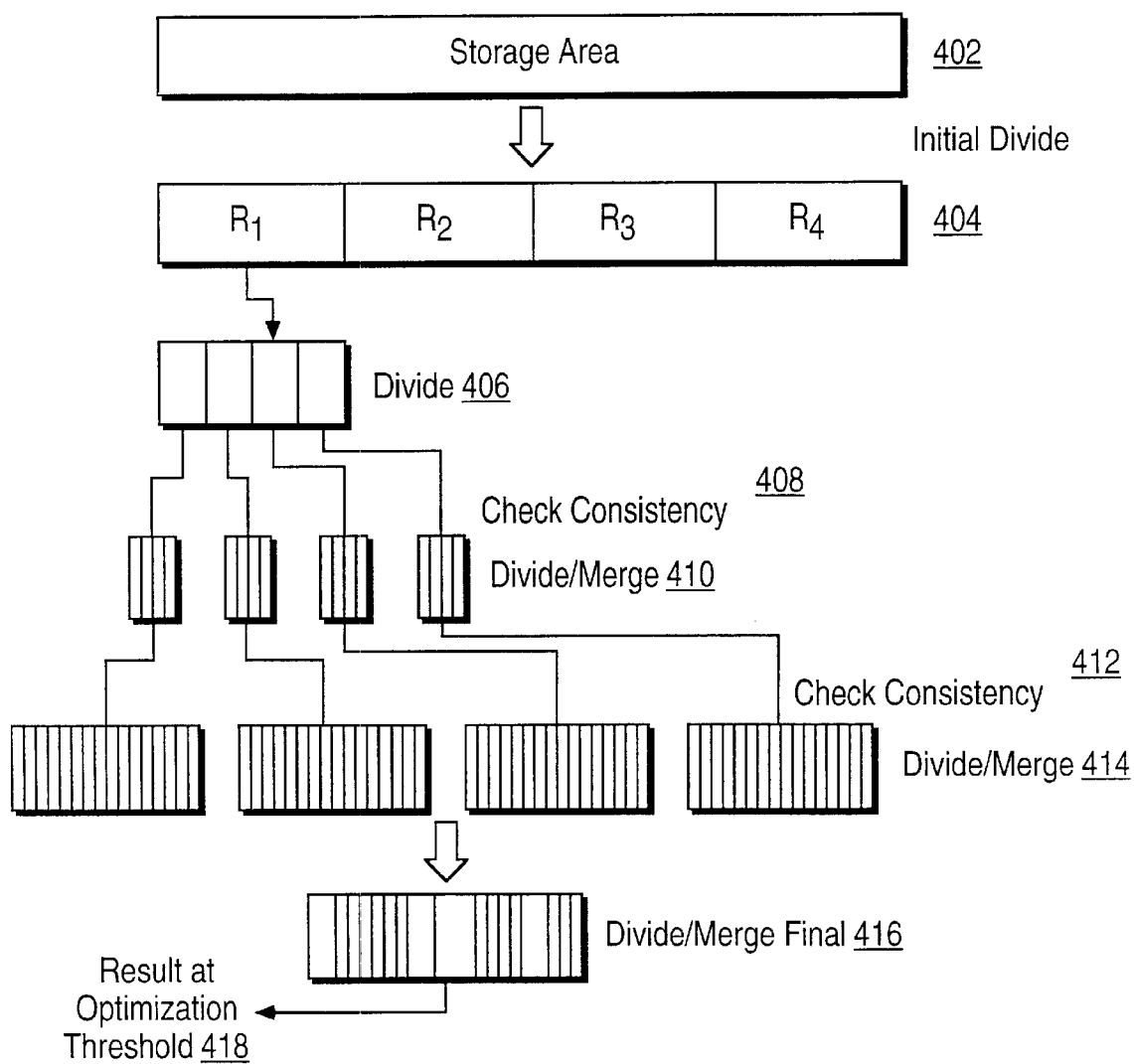

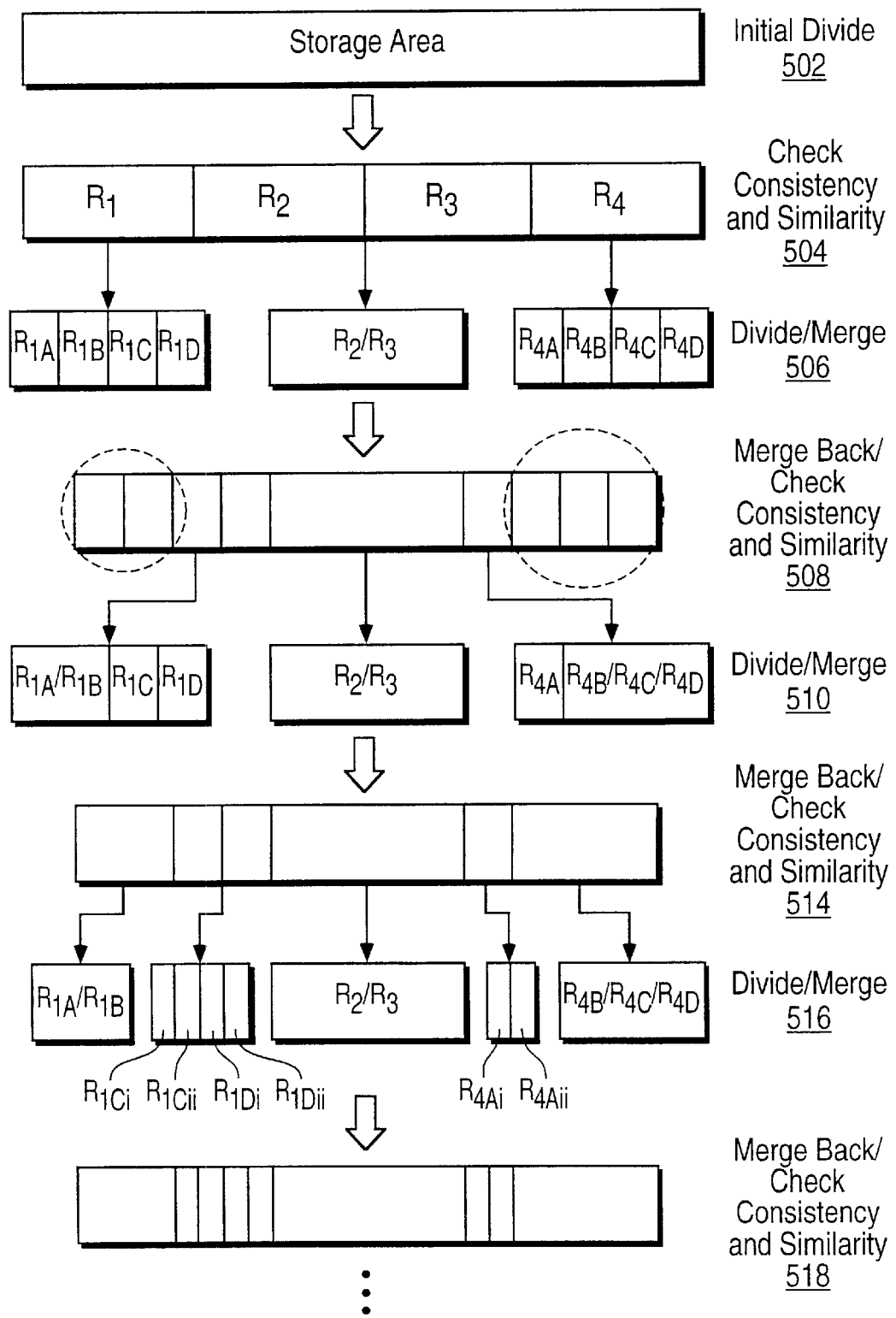

METHOD AND APPARATUS FOR MEASURING AND OPTIMIZING SPATIAL SEGMENTATION OF ELECTRONIC STORAGE WORKLOADS

BACKGROUND

The invention is generally directed to optimizing electronic storage devices and systems and, more particularly, to a method and apparatus for measuring and optimizing spatial structures of electronic storage workloads.

In modern computers and related devices and systems, the ever increasing flow of data demands efficient non-volatile storage devices used to store and access data. Many different entities within a computer as well as those external to the computer increasingly demand more access to data. Within most computers, several different devices exist to accommodate these demands. For example, Random Access Memory (RAM) and flash memory are used for fast and efficient access to data, but are limited in storage space. They are typically used for temporary storage of data. Larger devices such as tape drives are used to store larger amounts of data, and have relatively slower access. Storage devices such as disk drives are used most prominently for storing large amounts of data in computer databases as well as other devices. The data access rate of disk drives can vary widely depending on the access pattern and the data organization. One reason for this is that access characteristics can vary greatly among devices and different applications. Thus, proper storage system planning is required in order to allocate space to and to optimize the use of a computer's overall memory and storage devices.

Storage planning involves the assessment of data storage activity within a computer or system. This planning is greatly affected by the different types of access activity of applications that may be running on a system. For example, some applications perform a large proportion of read operations, such as data mining. Other applications perform a large amount of write operations, such as transactional processing. Some applications perform I/O (input/output) operations in small amounts, such as email messages, where others use large ones, such as in databases. Some applications perform I/O operations that are very sequential in nature, again, like data mining, where others are random, such as email and transactional operations. Some applications access storage space frequently, such as transactional processing and email indexing, where others access storage space rarely, such as email data for old or archived messages. Some applications are bursty, where data is accessed at widely varying rates, for example, many accesses followed by periods of time with few accesses. Other applications access data in a non-sequential manner. Still others may access data in a continuous manner, where data is accessed in steady amounts and at a steady pace. Other access characteristics can exist as well, further complicating storage management, such as the spatial locality of the data access.

For mass produced computers, access characteristics may be measured by defining a single logical volume, wherein the logical volume is the storage area available on the disk. Within this area, access characteristics exist that may vary according to the particular applications that utilize particular portions, such as blocks or partitions, of the area. These characteristics may include data access rates, access patterns, burstiness of the access, locality of the access, and other characteristics. The access characteristics of the area may be monitored using conventional techniques. This information may be used to plan the memory and storage devices in a computer or system. However, difficulties in planning arise as a result of the predetermined nature of the block divisions or partitions.

Within these blocks, access characteristics can vary widely. Access characteristics, such as those discussed above, can differ greatly depending on which application or applications access the particular portions of the storage area. In conventional methods of monitoring the space, the data defining the varying characteristics are typically averaged over the entire storage space, diminishing the effectiveness of monitoring the space. For example, typical file systems within a personal computer contain both frequently used files, such as indices, and less frequently used files, such as email data and older messages. In an ideal computer system, the more frequently used files would be best stored in a fast device. Similarly, the less frequently used files could be stored in a less expensive, slower device. This can be true of other devices and systems. Without the capability to identify areas of such disparate access, the goal of judicious use of storage space is not fully realized.

Thus, it would be useful to provide a new method and apparatus for more intelligently measuring and optimizing the spatial structure of electronic storage devices. This would improve the management of storage use, thus improving the overall performance of such devices. As will be seen, the invention does this in an elegant manner.

SUMMARY OF THE INVENTION

A method and apparatus is provided for measuring and optimizing the orientation of data access of an electronic storage device according to data access characteristics. These characteristics may be derived from a trace taken of the access activity of the storage space. The method includes monitoring storage access activity in an area of storage space and gathering data pertaining to one or more storage access characteristics. The method further includes measuring characteristics of the storage access activity of at least two individual portions of the storage space. These activities may be measured according to a predetermined parameter. Also, these measurements may or may not have temporal, spatial and other quantified factors.

Using this history of access activity, more judicious use of storage space may be obtained where conventional methods have failed. Depending on their homogeneity of access characteristics, the individual portions may then be left alone, merged with other similar portions, or further subdivided into sub-portions, which may be further merged, divided or left alone. At each merger or division, determinations can then be made of whether the characteristics of storage access activity of one individual portion or sub-portion are similar to that of another portion according to predetermined criteria. If the characteristics are similar, the two portions may be merged into a single portion. If the characteristic is not similar, it can then be compared to that of another portion. This process may then continue until the data access factors are optimized according to predetermined criteria.

BRIEF DESCRIPTION OF THE DRAWINGS

FIG. 4 is a flow chart illustrating a method of dividing and merging portions of storage area for optimization according to the invention; and FIG. 5 is a flow chart illustrating another method of dividing and merging portions of storage area for optimization according to the invention.

DETAILED DESCRIPTION OF PREFERRED EMBODIMENTS

Figure 1:
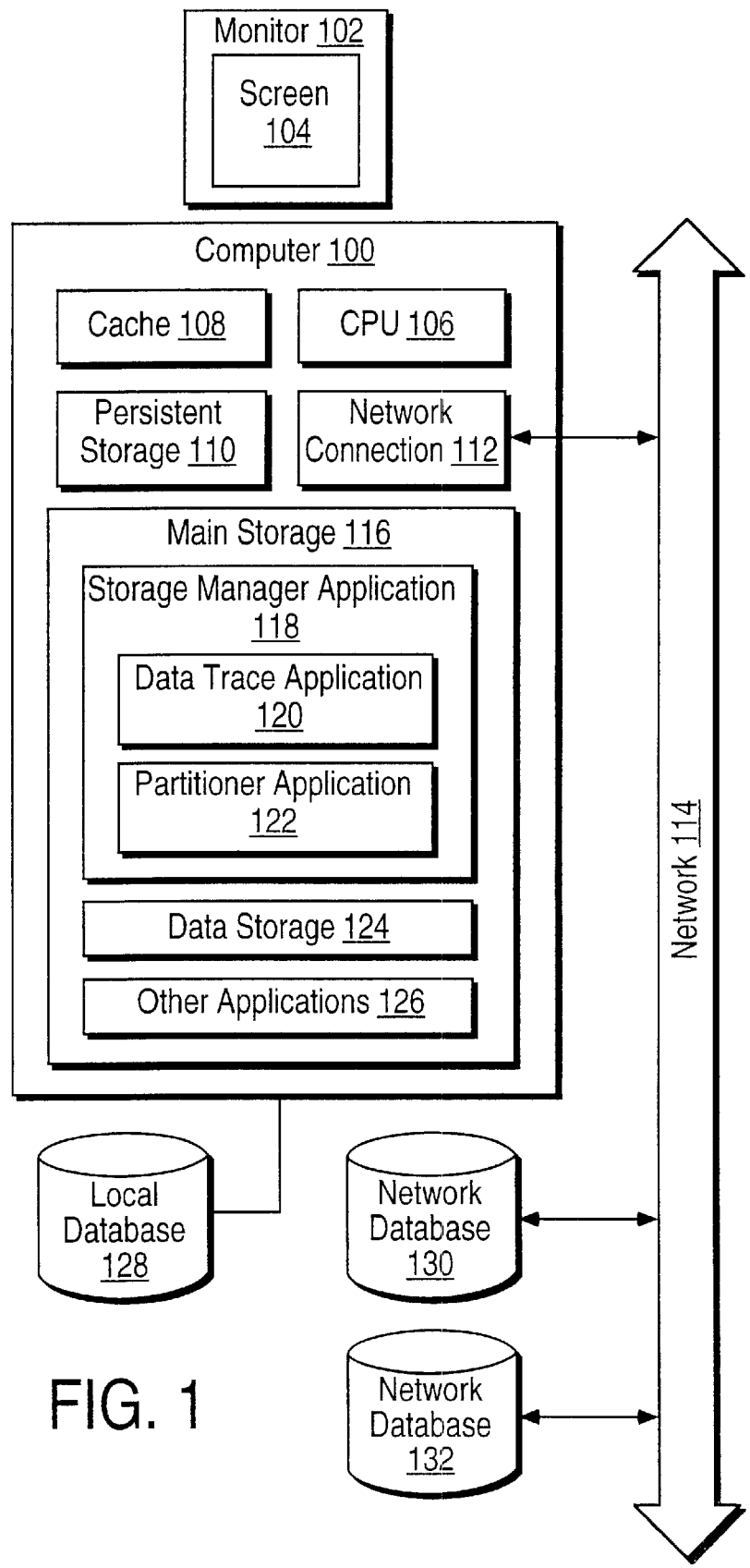
FIG. 1 is a diagrammatic view of a system for measuring and optimizing the spatial structure of electronic storage workloads according to the invention.

The invention provides a method and apparatus for measuring and optimizing the data access activity of electronic storage devices. Generally, the method includes an analysis of the I/O activity of storage space. In a disk drive storage device for example, storage space may be analyzed according to the I/O activity in its disk space. The space may then be divided or merged from a spatial point of view. The divisions and mergers of portions of the storage area are done according to access characteristics of individual portions of the storage space, including the I/O activity. The I/O activity may include the number of I/Os in a particular portion, the rate of I/Os over a period of time, the ratio of reads to writes, the locality of I/O activity, access patterns, burstiness of the access, and other characteristics. These characteristics may be measured and used to optimize the use of the storage medium and to aid device and system designers in laying out designs.

In one embodiment, the information may be used by a device, a personal computer for example, to dynamically monitor and manage data access of storage devices. If neighboring portions are found to have similar access characteristics, they may be merged from a spatial perspective. If they are found to be different, they may be left alone. It will be appreciated, however, that this is a limited illustration of the utility of the invention, which has greater applicability and utility. The scope of the invention is defined by the appended claims, and includes all equivalents that a person skilled in the art could ascertain upon review of this specification, and possibly publications available to such skilled persons who practice similar technologies.

Spatial segmentation refers to the utilization of storage space of the electronic storage medium. This space may be divided up into individual portions. According to the invention, the boundaries of the portions are established according to statistical access characteristics of the space. Generally, the space may be analyzed according to the access characteristics, such as how the data is accessed and how data is stored in and retrieved from the space. These characteristics may be expressed in terms of frequency of access, such as the number of I/O accesses that occur over a period of time. They also may be expressed in terms of consistency and randomness of the use of geographic space, where the boundaries of use may dynamically change over time according to the particular use of the space. They may also be expressed in terms of consistency and randomness of use of space over time. For example, access is said to be bursty when amounts of data are accessed in widely varying rates over time. This is in contrast to sequential or consistent access, where data stored in a space, such as within a portion, is steadily accessed over time.

The utility of dividing up the storage medium into portions is not restricted to disks or to any particular type of electronic memory device or storage device. For example, a storage system may be configured as a combination of a non-volatile storage (such as flash memory, currently used commonly in digital cameras) and electronic storage disks. A system could also be configured with different disks of varying capacity and speed. By intelligently dividing a storage space into portions with statistically homogeneous access activity, the placement of different parts of the data to be stored onto different media may be optimized.

One benefit to splitting the storage space into pieces with statistically homogeneous activity is an increase in the predictability of performance of a storage device. The performance of such a homogeneous portion, when placed on a storage device or group of devices can be predicted much more accurately than if the store were treated as a monolith with many different types of access. For example, it is relatively simple to accurately predict the performance of a portion that experiences only sequential reads of 16KB when it is placed on a disk. By contrast, it is relatively difficult to accurately predict the performance of a portion that experiences a mixture of sequential and random (non-sequential) reads and writes, when it is placed on a disk. Accurately predicting performance makes it possible to place stores onto disks or other media to meet the user's performance requirements reliably and with minimal cost. The invention accomplishes this in an elegant manner.

In one embodiment of the invention, an online tool may be embedded in a device for managing storage activity. In such an embodiment, the tool would be able to monitor storage space access patterns as they occur. Since these patterns typically change over time, an embedded tool that incorporates the invention is able to monitor storage accesses as needed in order to more efficiently manage the use of storage space. In one embodiment, the tool can take periodic samples of access characteristics to determine whether the storage space needs to be reapportioned according to its use. In another embodiment, every access operation may be monitored in order to get a more complete understanding of the access characteristics. Such a tool may operate as an external storage controller. It may also be part of the computer, such as an I/O board, or a part of the storage system, such as a Storage Area Network Switch, or a part of the storage device, such as the device controller.

In either embodiment, the tool may be specific to a single machine, where the tool is embedded in hardware that controls the placement of storage data, such as in a disk array controller. Alternatively, the tool may be embedded in a software layer in the operating system that may also control the placement of storage data in multiple devices, such as a logical volume manager. If the invention is embodied in network-oriented hardware, such as a controller for network storage devices, then the storage activity of several devices may be monitored and controlled. In either configuration, according to the invention, any underlying changes made to manage the access activity may be made seamlessly, without the running applications being disturbed or interrupted. The applications would merely exhibit an improvement in performance.

Referring to FIG. 1, a system that may utilize such features of the invention is illustrated. It is contemplated that the system may include one or more computers to perform the tasks set forth herein. It will be understood by those in the art that a system can be configured such that different tasks can be performed by any number of computer or processing devices. For example, a plurality of computers may access a storage area network (SAN), wherein one or all of them run a storage space tracing tool. One computer may manage the operations, providing access to particular storage space, governing access to the space, and performing other functions to help administrate access to the space. Another computer may analyze the trace information and make storage management decisions. Some tasks may also be performed by multiple computers simultaneously. Thus, the tasks may be performed by a computer, or by a distributed system, where tasks are delegated to different devices. The description below is described in the context of a single computer performing certain functions related to the methods herein described. However, those skilled in the art will understand that performing the same tasks in distributed systems is also contemplated. The invention is in no way limited to any particular system configuration.

The system may include a computer 100, having a monitor 102 and a screen 104 composing a graphical user interface, such as those designed for a user to monitor the operations and results of software applications. The computer may include a central processing unit (CPU) 106 configured to execute software code stored for use by the computer. Such code may define a software application that, when executed by the CPU, can cause certain operations to be performed, and data to be stored in storage devices.

Many different storage devices may be accessible to the computer 100. Such devices may include cache storage 108 and persistent storage 110 that are housed within the computer. There also may be storage devices located externally to the computer. Databases and other storage devices may be accessible via network connection 112 if they are able to communicate with network 114 or by other communication means. Most computers such as computer 100 also include a main storage 116, configured to store a large amount of information. The data stored in main storage may include applications to be executed by the CPU along with related data to be used or produced by such applications. One such application that may be stored is storage manager application 118. Data storage 124 may include space for data to be stored in connection with the storage manager application as well as other applications 126.

According to the invention, the storage management application may include data trace application 120 and partitioner application 122. Generally the data trace application is configured to sample the access activity of a storage device to monitor one or more data access characteristics of the device. This sample may be taken according to a host of parameters such as time, physical storage space and amount of data for example. The partitioner application is configured to divide up storage space in a device, such as the disk drive space that may make up main storage 116, according to monitoring data collected from the execution of the trace application. In one embodiment of the invention, the storage manager application is configured to manage the storage devices housed within the computer. Such an application may be a dynamic storage manager that collects data pertaining to storage access. In such a configuration, data may be collected by the trace application in statistical samples and used by the partitioner to judiciously manage the access of data. In another embodiment, all I/O activity may be monitored by the storage manager, giving it more accurate information for which to delegate the storage of certain data in particular locations.

Still referring to FIG. 1, as discussed above, the computer may have access to the storage devices such as local database 128. This database may be a separate device that includes a disk drive having surface area that may be monitored and partitioned by the database manager. Other databases such as network databases 130, 132 may also be accessed by the computer via network connection 112 to network 114 with which the network databases may be accessed. These databases may also be managed by a storage management application. According to the invention, the trace application may monitor the access activity of these remote storage devices in order to optimize the access to data stored in them.

Figure 2:
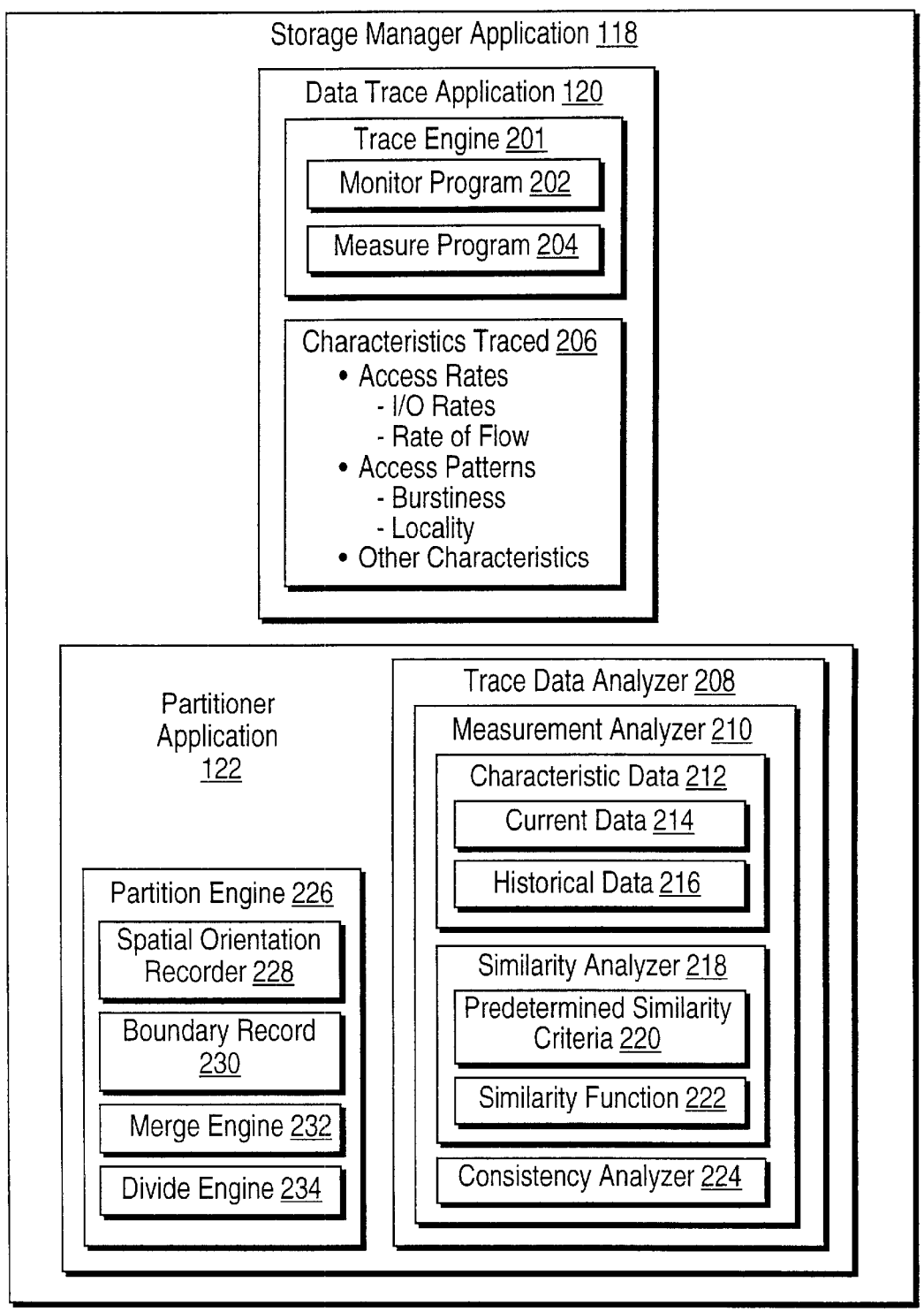
FIG. 2 is a more detailed diagrammatic view of a storage manager application shown in FIG. 1 according to the invention.

Referring to FIG. 2, a more detailed diagram of the storage manager application is illustrated. The data trace application 120 includes trace engine 201 that is configured to perform a trace of data access activity in a storage device. The monitor program may take samples of data accesses to a storage device, or may analyze every access to a storage device. In either configuration, the data is measured in with a measuring program 204 in order to quantify the characteristics of the data access activity. The different characteristics traced 206 may be quantified to a measure that allows the partitioner application 122 to intelligently partition storage space for optimal performance. The characteristics traced may include access rates. Such access rates may include the rate of input and output of data to and from storage space. This I/O data may be measured in amounts of data transmitted to or from the storage device, or in rates of flow of data over time. Characteristics may also include access patterns such as the burstiness of the access, or the sequential patterns of data access. The locality of access may also be measured. The locality of data access may be defined as the patterns of storage locations in terms of their geographical location on the disk. The locality may also be defined as patterns of access in terms of addresses in storage as defined by the computer's operating system. Other characteristics may also be measured and quantified for use by the partitioner application.

Partitioner application 122 may include two general entities, the trace analyzer for analyzing data collected and measured by the trace application, and the partition engine that performs the partition of storage space according to the analysis performed by the trace analyzer 208. The trace data analyzer 208 includes a measurement analyzer 210, configured to analyze the measurement data from the data trace application 120. The measurement analyzer categorizes the characteristic data 212 into current data 214, which is composed of the most recent trace data from the storage space. It also retains historical data 216, which includes past trace data for analysis in partitioning storage space. Together, both the current and historical data are used to analyze the access characteristics of the storage space.

The measurement analyzer further includes similarity analyzer 218 configured to analyze the similarity among portions of the storage space that are partitioned for separate treatment by the storage manager. Generally, similar partitions or portions are merged together and share common access activity as governed by the storage manager application. Another way to characterize the similarity is a determination of whether two portions are consistent with each other, or, simply whether they share data access characteristics. For example, an area of storage that is frequently accessed may be utilized for applications that require such frequent access. Such an area may also be relieved of such frequent access by diverting data access to other areas. One way to accomplish this is to maintain a remote storage of the same data for separate access. This way, entities that require access to the data can be satisfied without unduly burdening any particular storage space.

Whether two portions are similar depends on a similarity function 222. Such a function may be determined based on the similarity of neighboring storage space portions, and is based in the predetermined similarity criteria. For example, the similarity analyzer may gather the following statistics on two given portions of storage space:

The density of I/Os, or how many I/Os occurred in each portion,

The ratio of reads of data to writes,

The size of the I/Os,

The spatial locality of the I/Os, or whether the I/Os tend to be sequential, meaning temporally successive I/Os are at sequential locations, or at least near each other (not necessarily next to each other), The temporal locality of the I/Os, or whether the I/Os tend to occur in bursts, at random times, or on a regular time basis.

Each of these characteristics from one portion of storage space may then be compared to the same characteristic of a neighboring storage space to determine whether they are similar. The similarity function of one embodiment of the invention could be $$\text{similarity} = f(x) = f(\{\text{statistics (portion 1), statistics (portion 2)}\})$$

Similarity may have a value between 0 and 1. This restriction does not reduce the generality of the similarity measure. If it is calculated to have a different range, e.g., from 1 to infinity or some other range, a simple mathematical transformation will map that range into the desired range of (0, 1). For example, for the 1 to infinity range, the transformation may be $1-1/x$. Here, if $f(x)=0$, the portions are completely different. And, if $f(x)=1$, the portions share identical characteristics. A practical consideration must be made to decide whether to act based on the similarity of the portions, e.g., whether to merge, divide or leave the portions alone. For example, assuming that 0.6 is the similarity threshold value, if $f(x)$ is greater than 0.6, then they are similar enough, and merging the portions should be considered. If the result lies somewhere else, the portions are left alone and not merged.

The consistency analyzer 224 is configured within the measurement analyzer to determine whether a portion is internally consistent. This analysis may be configured to operate as a separate operation, or together with the similarity analysis, which is a related function. To determine whether a portion is internally consistent, it is divided up into sub-portions. Then, sub-portions are compared to determine their similarities with other sub-portions. The similarity threshold used for determining the internal consistency of a portion may or may not be different from the threshold used to determine whether two portions are similar enough to be merged. So, for example, if the similarity threshold for comparing portions for merging is 0.6 and the similarity threshold for checking the internal consistency of a portion is 0.1, then the internal consistency of a potion is checked as follows. All neighboring pairs of sub-portions of a portion are compared to check if their similarity is 0.1 or higher; if this is so in all cases, then the portion is deemed consistent and not sub-divided. If, however, there are some pairs of neighboring sub-portions whose similarity is lower then 0.1, then the portion is sub-divided into sub-portions. The neighboring pairs of sub-potions whose similarity is greater than 0.6 are merged. The resulting sub-portions are henceforth treated as full portions. This is discussed in more detail below in connection with FIG. 3B.

In one embodiment of the invention, the partitioner application 122 further includes a partition engine 226 that is configured to partition portions of storage space according to results generated by the trace data analyzer. The partition engine is configured to divide up storage area when area is found to be inconsistent. It is also configured to merge areas when they are found to be consistent with each other. In order to retain a history of spatial segmentation, a spatial segmentation recorder 228 is provided in the partition engine. The recorder is configured to store and record the boundaries of particular storage space according to its spatial segmentation, or work load characteristics. A boundary record 230 is also provided to record and possibly track boundaries of partitioned areas. Merge engine 232 is provided for merging partitioned portions when they are found to be similar, or consistent. Divide engine 234 is configured to divide portions that are found to not be internally consistent.

In one embodiment, portions are defined in intervals of storage locations. These intervals include the end points. For example, portions existing at location [0, 511] and [512, 1023] are direct neighbors. Both of these portions are 512 kilobytes long. Also, when defining a portion to which a particular access, or I/O, activity takes place, any particular access activity may be designated as occurring in the portion at the address in which the I/O location starts. This designation gives a consistent rule for determining which portion a particular access activity occurs when it is measured. This way, when an access activity occurs between portions, it can be properly designated, and not counted for two or more portions. It is also preferred that portions be kept at a multiple of the size of the access activity. In practice, most individual access activities are no larger than 256 kilobytes. So, for example, if portions are kept no smaller than 1 megabyte, the particular choice of which portion to designate any given I/O does not make any appreciable difference in performance. It is also preferred that the portions be kept several times the largest access size.

Figure 3A:
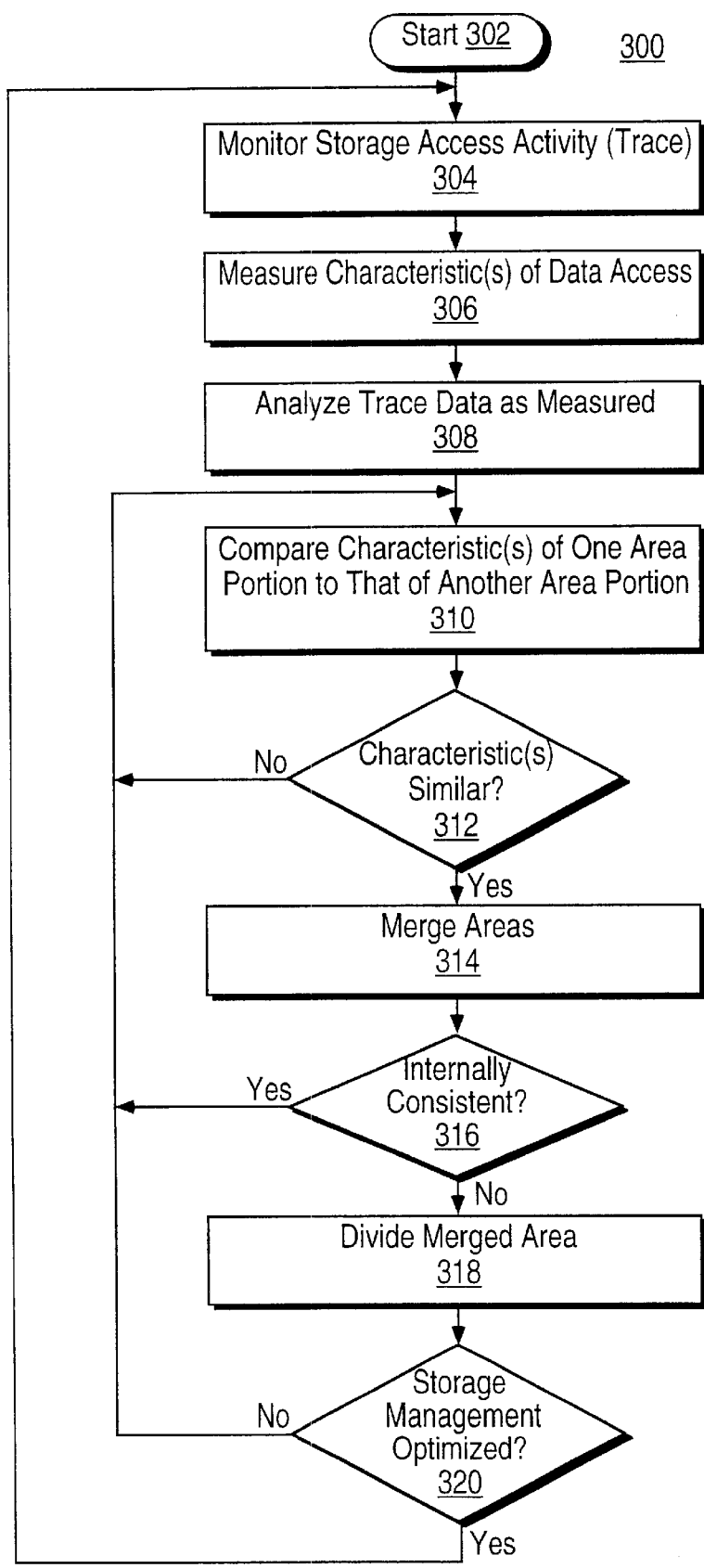
FIG. 3A and FIG. 3B are flowcharts illustrating a method for measuring and optimizing the spatial structure of electronic storage workloads according to the invention.

Referring to FIG. 3A, a flow diagram is provided showing one embodiment of the invention that defines the methods of the trace engine and partition application in a concerted process. Generally, the input to the process is a trace of access activity for a given area of storage space. The output is a collection of partitions that define the boundaries of particular portions. In step 302, the process begins. Prior to the initial steps, a predetermined number of partitions are established in order to have several initial portions in which to compare. The storage access activity is monitored in step 304, where a trace is made.

If the application is intended to provide data for designers to design and develop computer systems, the output data of the trace is the end result. Such a model is an offline operation, where the computer or system is run through a simulated operating scenario. In this case, certain software applications are run to simulate a typical user's operation of the computer or system. The output data of the trace is then analyzed by designers to plan and design similar systems. Such planning includes properly choosing and configuring storage and memory devices. In the dynamic embodiment, the trace is taken dynamically while the system is run, and the output data is used to govern where certain data is stored.

In either case, the characteristics of the data accessed are measured to quantify the characteristics in step 306. The access characteristics are quantified in order to establish a base of information in which to use to compare different portions in order to determine similarity and consistency. Another way to explain this is determining whether the two portions are statistically compatible, that is, whether the access characteristics match between the portions. The test of internal consistency involves determining whether the measured access statistics for each portion are in a sense similar, or consistent with other neighboring portions. The measurement for each characteristic may be different for different types of characteristics. Therefore, the similarity and consistency functions depend on the relative comparisons between different portions of storage space.

One characteristic measurement that can be made, the I/O density measurement, is based on the total number N of I/Os per portion measured, and is scaled by the spatial length of the portion. This density is illustrated as follows:

$$d = \frac{N}{L} = \frac{N}{\text{upper address} - \text{lower address} + 1} \quad (1)$$

In a preferred embodiment, the measurement is not time based, but primarily based on the size of the portion being measured. And all characteristics are measured over a uniform time period for statistical consistency. Assuming that the measurement is a Poisson distribution having N uncorrelated events, and e is a tunable number denoting an error scale the error function is then:

$$\sigma_d = \frac{e(SQRT(N))}{L} \quad (2)$$

A suitable value for e is 1, although other values may be used. Smaller values make the test more restrictive, while values larger than 1 make the test less restrictive, more flexible. This error function is used to determine whether two portions are internally consistent. For example, given two different portions having densities d and d', they have corresponding errors $\sigma_d$ and $\sigma_{d'}$ respectively. The similarities between the two portions can be determined by difference $\Delta$ between these two density measurements, scaled by a joint error of the difference, illustrated in the following formula:

$$\Delta = \frac{d - d'}{SQRT(\sigma_d^2 + \sigma_{d'}^2)} \quad (3)$$

In this analysis, the direction of the difference is not relevant, only the size counts. For a $\Delta=0$, this evidences a 100% probability, or internal consistency. And, where the absolute value of $\Delta$ is very large, this implies a very low probability, or no internal consistency. According to the invention, the size of $\Delta$ that defines the absence of internal consistency must be established in order to optimize the setting of the boundaries of the individual portions. It has been found in practice that with high I/O counts, statistical effects such as $\Delta$ become less important than other factors, such as systematic effects. For this reason, a designer may limit the size of the relative error term. Given the definition of error function in equation (2) above, this would force $\sigma_d/d > \epsilon$, for a certain fixed value $\epsilon$. This is the equivalent to limiting $N < \epsilon^{-2}$. Also, the two densities of two portions can be expressed as a ratio, or $1+\delta=d/d'$, assuming that $d \geq d'$, where the opposite case is symmetric. This simplifies equation (3) to $$\Delta = \delta(SQRT(\epsilon/2)) \quad (4)$$

Another simple way to express the difference metric for large I/O counts is $\Delta = \alpha|d-d'|/\min(d,d')$, for an appropriately chosen value of $\alpha$, such as 0.8. In a preferred embodiment, both equations (3) and (4) are evaluated, and the smaller of the two, the more probable one, is used to determine consistency. The value of $\epsilon$ must be chosen in order to properly define the boundaries of the portions. In practice, it has been found that limiting N in equation (2) to 10% of the total number of I/Os of the entire trace works well.

Two other characteristics that can be measured are the read/write ratio and the I/O size measurement. In a preferred embodiment, these measurements rely on histograms, which are compared using the Chi-square test. The histogram is a discrete version of the probability distribution function of the characteristic being measured, e.g. read/write or I/O size. The test statistic used is:

$$X^2 = \Sigma\, X_i^2 = \Sigma(((SQRT(N'/N))H_i - (SQRT(N/N'))H_i')/(H_i + H_i')) \quad (5)$$

Where $H_i$ and $H_i'$ are the histograms of the I/O counts of two neighboring portions to be compared, the bins in the histogram correspond to ranges of values of the measured characteristic, and where N and N' are the individual total number of I/Os in each portion. The value of $X^2$ can then be converted into a probability, which may be the output from the measure program 204.

Regarding the read/write ratio, since this measurement has numerical stability, it is an application of the generic histogram measurement discussed above. The measurement is what is known in the art as a 2-bin histogram, and it has one bin for reads and another bin for writes.

The size of the total I/O access is a more complicated application of the Chi-squared discussed above, and it includes an application of the Chi-squared technique with multiple bins. The number of bins should be a number of distinct I/O sizes that may occur in a particular environment. It that number is too large for a particular application, a sensible number, e.g. between 100 and 1,000 may be chosen. In one embodiment, the I/O size histogram and the bin width are fixed at 256 bins from 1 kilobyte to 256 kilobytes. Also, it is preferred that, for each histogram, a fraction of the total bandwidth of the I/Os in the storage space portion that it accounts for is calculated. Then, each histogram bin is limited to not contribute more than 10% of the total $X^2$ sum that is calculated in equation (4) above, unless $H_i/N$ or $H_i'/N$ is greater than 0.1. This is an application of robust statistics, which does not produce a true probability, but rather is skewed toward larger values.

Measuring the spatial locality access characteristic is a process that is widely studied in the art of measuring storage workloads. The measurement has a large impact on device performance. One common method for measuring the spatial locality is known as the spatial run count. In a preferred embodiment of the invention, for each storage space portion, the spatial run count Lambda $\Lambda$, a real number that is greater than or equal to 1, is measured. Then, a logarithm of the run count value is taken, $\lambda = \log_2 \Lambda$, then the mean $E\_\lambda$ and standard deviation $\sigma_\lambda$ from there, where each of the values of $\lambda$ are weighted by the number of I/Os in each storage space portion. In practice, typical values of $\lambda$ range from zero to twelve. Given the standard deviation, then the neighboring portions can be compared by calculating the scaled difference of $(\lambda - E\_\lambda)/(e\sigma_\lambda)$, where e is the error scale. Assuming that the values of $\lambda$ are normally distributed, the probability of consistency can then be calculated from the normal distribution.

The measurement of temporal locality is often termed "burstiness." For this temporality locality measurement, there is no standard metric. In a preferred embodiment, the coefficient of variation of interarrival time is used. For each portion of storage space, all interarrival times $\tau_i$ between subsequent I/O accesses are collected. There would exist (N−1) interarrival times if the portion experiences N total I/Os. Then the coefficient of variation is calculated of the interarrival times as the ratio of the standard deviation to the mean interarrival time, which is expressed as:

$$\kappa = \sigma_\tau / E\_\tau \quad (6)$$

Here, $E\_\tau$ is the mean of $\tau$. Note that $\kappa$ is scale free. If there are half as many I/Os in a portion of storage space, the interval times will double on average, and thus $\sigma_\tau$ and $E\_\tau$ both double. This would leave κ unchanged, so long as the interval remains unchanged. For well known temporal arrival patterns, κ is a relatively simple number. For example, for I/Os that arrive regularly, such as in fixed time intervals, κ=0. For a Poisson arrival process, such as exponential distribution of interval times, κ=1. For an extremely bursty arrival process, where a large number of I/Os occur very quickly, followed by long gaps, κ=∞. For uniform distribution of interval times, κ=1/SQRT(3). In order to calculate the consistency of a portion of storage space, it is preferred that the same technique be used as that discussed above for the spatial locality measure. The mean $E\_\kappa$ and standard deviation $\sigma_\kappa$ of κ, then compare neighboring portions of storage space by assuming that $(\kappa - E\_\kappa)/(e\sigma_\kappa)$ is normally distributed.

Finally, in testing consistency, these five measurements may be used to test consistency between two portions or sub-portions of storage space. Each of these measurements yields a probability $p_i$, where i=(1 . . . 5). And each is used to verify whether two separate portions or sub-portions are similar or consistent. Each of these probabilities is combined to produce one result used to determine whether consistency exists. In one embodiment, given a set of n hypothesis tests, with acceptance levels $p_i$, where i=(1 . . . 5), and the product of all of the probabilities $p=\Pi p_i$, the acceptance levels for the combined hypothesis test is $$q = p \Sigma(-1 n\, p)^i/i!, \ i=(0 \ldots n-1) \tag{7}$$

It will be appreciated to those skilled in the art that this is but an example of a method of calculation of the probability of consistency or similarity between two portions or sub-portions, and that this method may be modified to attain application-specific results.

Still referring to FIG. 3A, in step 308, this data is analyzed as it was measured in step 306. As an initial process, each portion may be analyzed to determine whether it is internally consistent using the techniques discussed above. The next step is to analyze the measured trace data in step 308. This is done by first comparing the access characteristics of each portion with those of other portions. In step 310, the portions of storage space are compared. In this step, the same access characteristics of at least two portions are compared at a time. In step 312, a query is made as to whether the characteristics are similar. The test for determining whether two portions are similar is discussed above. If they are not similar, the portions are left alone and the process returns to comparing other portion pairs. If they are similar, then the areas may be merged in step 314. The determination on whether to merge portions and/or sub-portions utilizes consistency data gathered as discussed above. Generally, if two portions or sub-portions are consistent, they may be merged into a common boundary. In a preferred embodiment, only neighboring portions or sub-portions are merged, where such partitioned areas of storage space share a common boundary as partitioned. In other embodiments, non-neighboring portions or sub-portions may also be merged.

The next step after the portions are merged is to test whether the combined portions are internally consistent in step 316 as discussed above. If so, the merged areas are left, and the process returns to step 310 where another pair of storage area portions are compared. If not, the merged areas are divided back and left in step 318. This process may continue until the portioning of the storage space is optimized, the determination of which occurs in step 320. This determination depends on the particular algorithm that is used to determine whether the space divisions are optimized. One way to declare that the space is optimized, is where all of the portions are internally consistent, and where no two neighboring portions can be merged into an internally consistent portion. If the space is optimized under such qualification, the process returns back to the start position where the storage access activity is monitored, or traced. If not, the process returns to step 310 for further comparisons and evaluations of whether portions and sub-portions are similar and/or internally consistent.

Figure 3B:
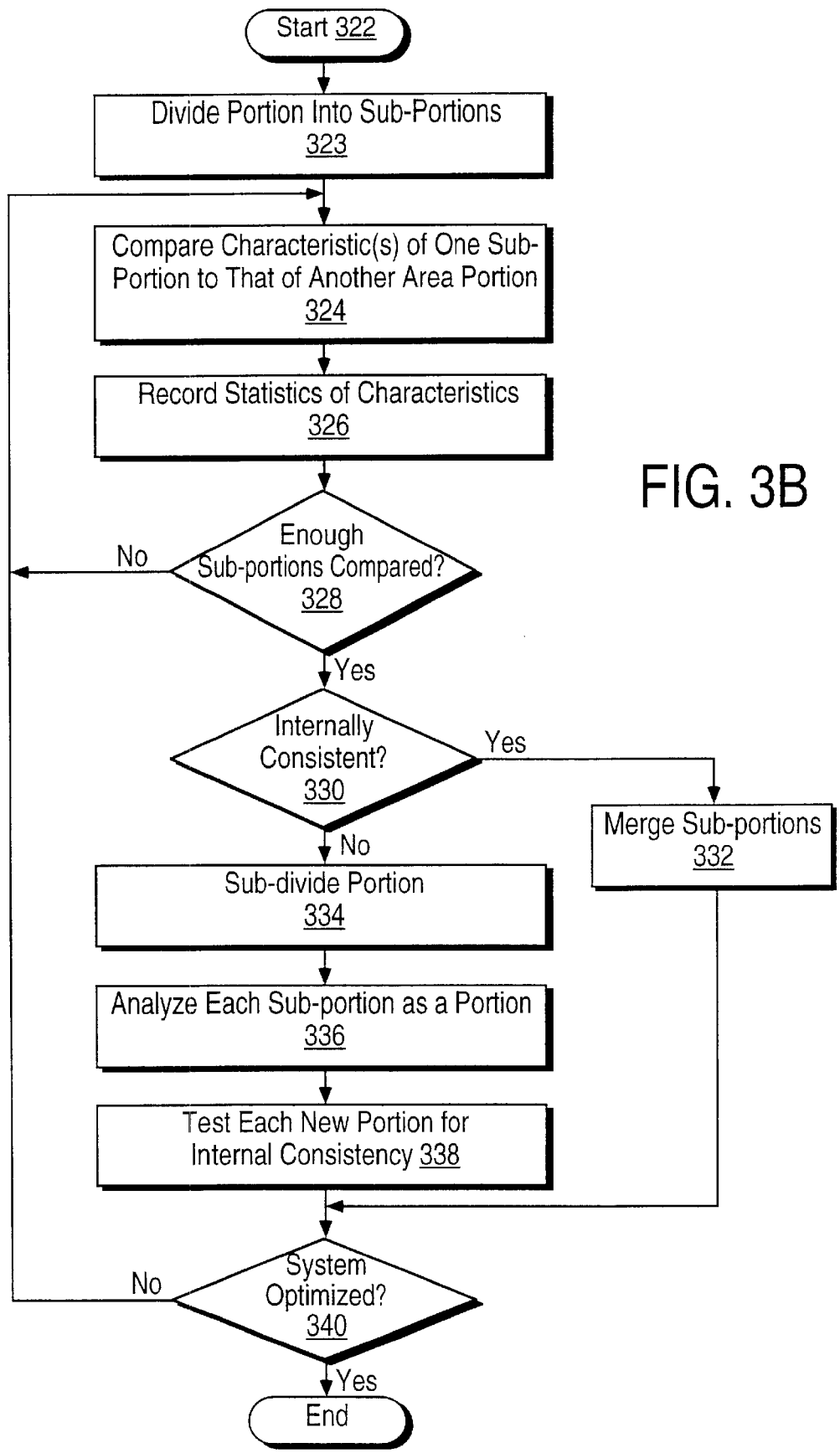

Referring to FIG. 3B, one embodiment of the invention, the test for consistency, is illustrated in a flow diagram. The process starts at step 322, and begins by dividing a portion into sub-portions in step 323. The next step is to compare the characteristics of one sub-portion to that of another sub-portion in step 324 to determine whether the two portions are similar. This comparison is a statistical comparison of access criteria such as that discussed above. In step 326, the statistics from the comparisons from step 324 are recorded.

In step 328, a query is made whether enough sub-portions are compared. This step is optional depending on the application. In some applications, for the test of internal consistency, only a subset of sub-portions are required to be compared to test for internal consistency. It will be appreciated by those skilled in the art that the number or proportion of portions to be compared depends on the particular statistical model is being utilized. They may all be analyzed if desired. If it is determined that not enough sub-portions have been analyzed, the process returns to step 324 to compare other pairs of portions.

If it is determined that enough have been compared, then the process proceeds to step 330, where it is determined whether the portion made up of the tested sub-portions is internally consistent. This test may be the comparisons of the access statistics as discussed above. If the portion is found to be internally consistent, the sub-portions are merged in step 332. If not, the portion is sub-divided in step 334. After the subdivision, each of the former sub-portions may be considered as a portion, each of these new portions may be compared with other neighboring portions to determine similarity in step 336. Also, each new portion is tested to determine whether it is internally consistent in step 338, just like the other portions. After the conclusion of either step 338 or 332, the process proceeds to step 340, where it is determined whether the system is optimized. At this point, it is determined whether the storage space has been subdivided enough. This is determined based on predetermined criteria that are established according to a particular application. The criteria are established to ensure that portions and sub-portions are divided and combined in such a manner that properly allocates the use of the storage space. If it is optimized, then the process ends. Monitoring of the space may continue as well. If it is determined that the system is not optimized yet, the process returns to step 324 where more sub-portions are compared.

In one embodiment of the invention, the process may continue through layers upon layers of portions, subdividing them into sub-portions, further dividing the individual sub-portions into more sub-portions. This type of tree structure may continue until a predetermined number of tree branches are attempted. Or, it may continue until a predetermined threshold has been reached, where the ability of the system to reasonably divide and merge portions has been exhausted. Then, the sub-portions may be merged into a finite number of similar and internally consistent portions for use in the computer system.

Referring to FIG. 4, an illustration of such a tree structure 400 is illustrated. The algorithm is a series of transformation passes on a tree of portions. The initial tree, step 402, is a root node that corresponds to the entire storage region. The portions generated by the initial division, step 404, are its children. At each step, a transformation takes place whereby individual portions are either merged with other portions, or divided up into smaller portions. According to the tree structure, the algorithm first causes the leaf portions, which are portions that have not been further divided yet, to be checked for internal consistency. If all of the children of a node (sub-portions of a portion) are internally consistent, then the portion (or node) is removed from the tree, and all are attached to its parent. In contrast, if a portion is found to be internally inconsistent, the portion is split into as few sub-portions as possible. This is done by first splitting the portion into a number of sub-portions. Then, the algorithm causes all neighboring portions to be combined that are statistically similar.

Still referring to FIG. 4, a sub-portion may be further divided in step 406 into further sub-portions, each of which are tested to determine whether all of the sub-portions are internally consistent in step 408. Each sub-portion is then divided, left alone or merged with a parent in step 410, according to the methods discussed above. Each sub-portion is then checked for internal consistency in step 412. Once again, the sub-portions are divided, left alone, or merged with a parent in step 414. The result occurs when the optimization threshold has been reached. In one embodiment, the threshold is reached in step 416 when all of the leaf nodes are internally consistent. In another embodiment, the threshold is reached after a predetermined number of cycles have been completed. The leaf nodes represent the resulting portions.

Referring to FIG. 5, an alternative, more simple method to that discussed above in connection with FIG. 4 is illustrated. The process 500 begins with an initial divide in step 502. New sub-sections $R_1$–$R_4$ are then each checked for similarity and consistency in step 504. Divide and merge operations are then performed in step 506. Here, it can be seen that portion $R_1$ is sub-divided in to sub-portions $R_{1A}$–$R_{1D}$. Similarly, portion $R_4$ is sub-divided in to sub-portions $R_{4A}$–$R_{4D}$. Portions $R_3$–$R_4$, being found similar (by comparing access statistics as discussed above) and internally consistent (by dividing up the merged portions into sub-portions that are tested for consistency as discussed above), have been merged. The remaining portions as defined by the new partitions are then merged back together in step 508. This is where this method greatly differs from that discussed above in connection with FIG. 4. Here, a tree structure is not established beyond the divide and merge step of 506. This method simplifies the process by avoiding the complicated tree structure configuration. After the new portions are merged back, they are treated as new portions, and are checked for similarity and consistency with each other in step 508. Other divide and merge operations may then be performed in step 510. Here, it is found that $R_{1A}$ and $R_{1B}$ are similar and internally consistent, and that $R_{4b}$, $R_{4c}$ and $R_{4D}$ are also similar and internally consistent. Therefore, these portions are merged in step 510. Again, the remaining portions are merged back together in step 514, where the portions are checked for similarity and internal consistency. Another divide and merge operation is performed in step 516, where $R_{1C}$ and $R_{1D}$ are divided into $R_{1Ci}$ and $R_{1Cii}$, and where $R_{1D}$ is divided into $R_{1Di}$ $R_{1Dii}$. It is further illustrated that $R_{4A}$ is divided into $R_{4Ai}$ and $R_{4Aii}$. Again, the portions are merged back in step 518, where they are checked for similarity and internal consistency. These steps may continue using predetermined criteria until either a threshold of consistency or similarity is reached, or after a predetermined number of iterations.

In general, the invention may include the utilization of dedicated processors, webservers configured to receive and route browser requests, application servers, state servers and other types of computer processors configured to communicate amongst each other and that may be connected to one or more networks, including a Local Area Network (LAN), an intranet and the Internet. Equivalent structures embodying the invention could be configured for such applications without diverting from the spirit and scope of the invention. The invention may also utilize personal computers, application servers, state servers or Internet webservers that are designed and implemented on a computer and may be connected to a network for communication with other computers to practice the invention.

The invention may also involve a number of functions to be performed by a computer processor, such as a microprocessor. The microprocessor may be a specialized or dedicated microprocessor that is configured to perform particular tasks by executing machine-readable software code that defines the particular tasks. The microprocessor may also be configured to operate and communicate with other devices such as direct storage access modules, memory and storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers, such as computer servers, that utilize the invention, there exist different types of storage devices for storing and retrieving information while performing functions according to the invention. Cache storage devices such as RAM are often included in such computers for use by the central processing unit as a convenient storage location for information that is frequently stored and retrieved. Similarly, a persistent storage is also frequently used with such computers for maintaining information that is frequently retrieved by a central processing unit, but that is not often altered within the persistent storage, unlike the cache storage. Main storage is also usually included for storing and retrieving larger amounts of information such as data and software applications configured to perform functions according to the invention when executed by the central processing unit. These memory or storage devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory or storage device, or to any commonly used protocol for storing and retrieving information to and from these devices respectively.

The apparatus and method include a method and apparatus for measuring and optimizing the data access activity of electronic storage devices. Although this embodiment is described and illustrated in the context of a storage space monitoring and measuring method, the scope of the invention extends to other applications where efficient management of storage space is useful. Furthermore, while the foregoing description has been with reference to particular embodiments of the invention, it will be appreciated that these are only illustrative of the invention and that changes may be made to those embodiments without departing from the principles of the invention, the scope of which is defined in the appended claims.

What is claimed is:

1. A method for managing data access, comprising:
   monitoring storage access activity in an area of storage space;
   measuring at least one characteristic of the storage access activity of a plurality of individual portions of the area of storage space according to a predetermined parameter; and
   determining whether the characteristic of storage access activity of one individual portion is similar to that of another portion according to predetermined criteria;
   if the characteristic is similar:
     merging the two portions into a single portion; and
   if the characteristic is not similar:
     measuring the spatial segmentation of the individual portion according to a characteristic of storage access activity; and
     comparing the characteristic if storage access activity to that of the other portion.

2. A method according to claim 1, wherein comparing the characteristic of storage access activity to that of another portion, comprises:
   dividing the individual portion into smaller portions;
   monitoring storage access activity of each smaller portion;
   measuring at least one characteristic of the storage access activity of each smaller portion; and
   determining whether the characteristic of storage access activity of one smaller portion is similar to the same storage characteristic of storage access activity of another one of the other smaller portions according to predetermined criteria;
   if the characteristic is similar:
     merging the two smaller portions into a single portion;
   if the characteristic is not similar:
     measuring the spatial segmentation of the one smaller portion according to a characteristic of storage access activity; and
     comparing the characteristic to that of another portion.

3. A method according to claim 1, wherein comparing the characteristic of storage access activity to that of another portion includes comparing the I/O density of the each portion.

4. A method according to claim 1, wherein comparing the characteristic of storage access activity to that of another portion includes comparing the I/O density of the each portion according to the following equation:

$$d = \frac{N}{L} = \frac{N}{\text{upper address} - \text{lower address} + 1}.$$

5. A method according to claim 4, wherein comparing I/O densities includes calculating the differences between the two density measurements, scaled by a joint error of the difference, according to the following formula:

$$\Delta = \frac{d - d'}{SQRT(\sigma_d^2 + \sigma_{d'}^2)}.$$

6. A method according to claim 1, wherein comparing the characteristic of storage access activity to that of another portion includes comparing the read/write ratio of the each portion.

7. A method according to claim 1, wherein comparing the characteristic of storage access activity to that of another portion includes comparing the read/write ratio of the each portion according to the following formula:

$$X^2 = \Sigma X_i^2 = \Sigma(((SQRT(N'/N))H_i - (SQRT(N/N'))H_i')/(H_i + H_i')).$$

8. A method according to claim 1, wherein comparing the characteristic of storage access activity to that of another portion includes comparing the I/O size measurement of the each portion.

9. A method according to claim 1, wherein comparing the characteristic of storage access activity to that of another portion includes comparing the I/O size measurement of the each portion according to the following formula:

$$X^2 = \Sigma X_i^2 = \Sigma(((SQRT(N'/N))H_i - (SQRT(N/N'))H_i')/(H_i + H_i')).$$

10. A method according to claim 1, wherein comparing the characteristic of storage access activity to that of another portion includes comparing the spatial locality of the each portion.

11. A method according to claim 1, wherein comparing the characteristic of storage access activity to that of another portion includes comparing the spatial locality of the each portion by:
    measuring the spatial locality
    taking a logarithm of the run count value, $\lambda = \log_2 \Lambda$,
    taking the mean $E\_\lambda$ and standard deviation $\sigma_\lambda$ from the logarithm of the run count value, wherein each of the values of $\lambda$ are weighted by the number of I/Os in each storage space portion,
    comparing the neighboring portions by calculating the scaled difference of $(\lambda - \lambda')/(e\sigma_\lambda)$, where e is the error scale; and
    calculating the probability of consistency from the normal distribution.

12. A method according to claim 1, wherein comparing the characteristic of storage access activity to that of another portion includes comparing the temporal locality of the each portion.

13. A method according to claim 1, wherein comparing the characteristic of storage access activity to that of another portion includes comparing the temporal locality of the each portion by:
    collecting all interarrival times $\tau_i$ between subsequent I/O accesses, where (N−1) I/Os exist if the portion experiences N total I/Os;
    calculating the coefficient of variation of the interarrival times as the ratio of the standard deviation to the mean interarrival time, where the ratio is expressed as:

$$\kappa = \sigma_\tau / E\_\tau$$

where $E\_\tau$ is the mean of $\tau$; and
    calculating the consistency of a portion of storage space.

14. A method according to claim 13, wherein calculating the consistency of a portion of storage space is done according to the following formula:

$$X^2 = \sum X_i^2$$
$$= \sum (((SQRT(N'/N))H_i - (SQRT(N/N'))H_i')/(H_i + H_i')).$$

15. A method according to claim 1, further comprising calculating the consistency between two portions of area of storage space according to the following formula:

$$q = p \, \Sigma(-1n\, p)^i/i!, \, i=(0 \ldots n-1).$$

16. In an electronic storage medium, a tree structured method of partitioning storage space of the storage medium, for use in monitoring and transforming the spatial segmentation of access to data stored in the medium, the method comprising;

establishing a root node corresponding to a storage region;

performing an initial division of the storage region, establishing individual nodes corresponding to the root node;

dividing a portion of storage space corresponding to an individual node into sub-portions, establishing leaves of the tree structure;

examining a portion corresponding to an individual node for internal consistency by determining whether the sub-portions corresponding to the individual node are similar;

transforming the spatial segmentation of access data, wherein:

if all of the sub-portions corresponding to a portion are internally consistent:

removing the portion from the tree and merged with the root node;

if the sub-portions are not internally consistent:

dividing the portion into further sub-portions; and combining all sub-portions that are statistically similar.

17. A method according to claim 16, wherein transforming occurs repeatedly until a threshold is reached.

18. A method according to claim 17, wherein the threshold is reached when all of the leaves of the tree structure are internally consistent.

19. A method according to claim 17, wherein the threshold is reached when a predetermined number of transformations have occurred.

20. A method according to claim 17 wherein the leaf nodes represent the resulting portions defined for data access.

* * * * *